Patented Sept. 27, 1927.

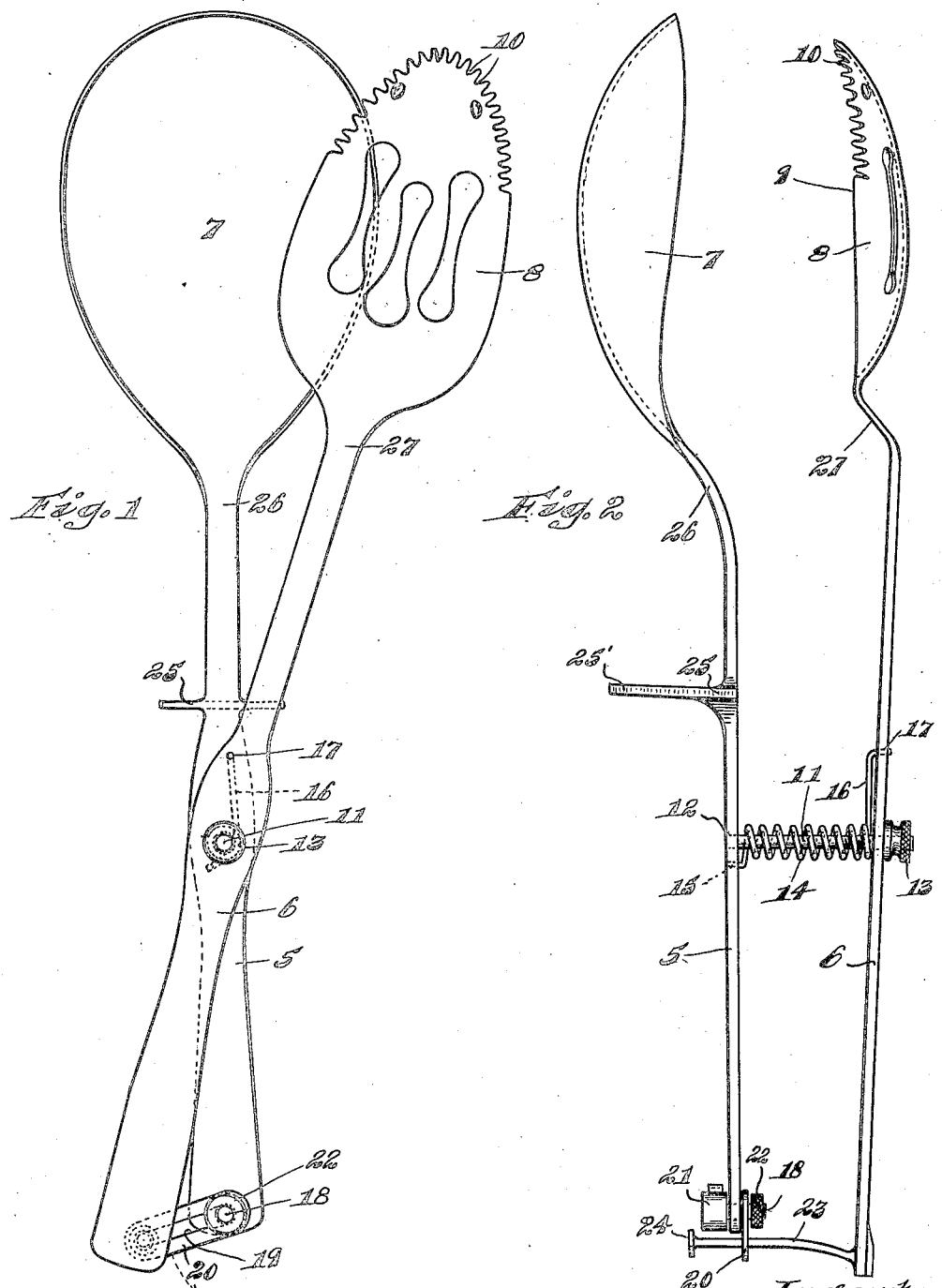

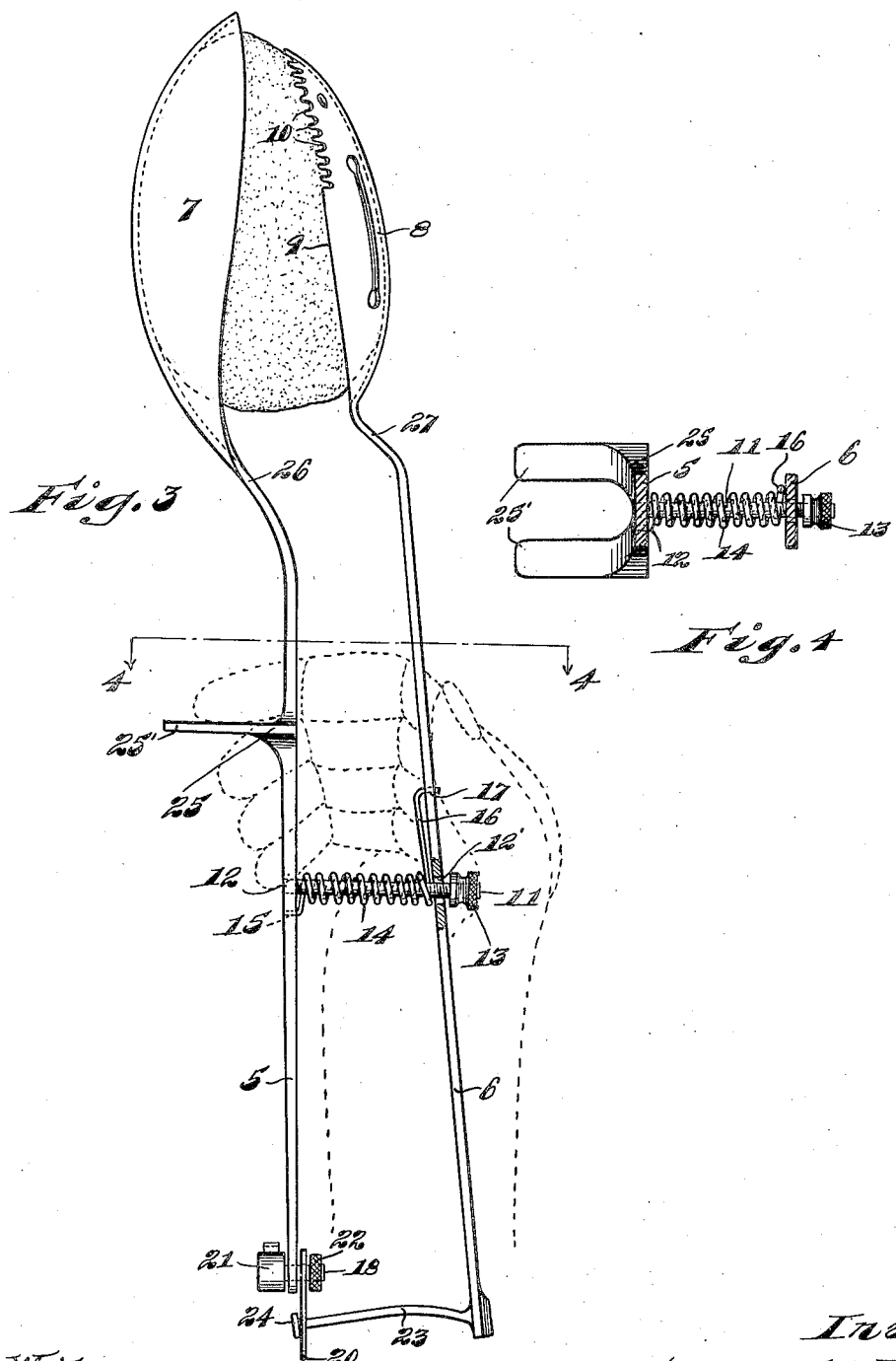

1,643,456

UNITED STATES PATENT OFFICE.

SAMUEL W. JAMES, OF CHICAGO, ILLINOIS.

SERVING IMPLEMENT.

Application filed July 1, 1926. Serial No. 119,873.

My invention relates to serving implements, and the same has for its main object the provision of an improved article of this kind for general domestic use in preparing and serving food and designed especially for use by waiters, servants and others in serving food at the table.

Another object of my invention is the provision of a simple and efficient serving implement whereby food may be served at the table with ease, grace and safety; and a further object is to provide an implement which can be conveniently held and manipulated by one hand, leaving the other hand free for holding the food container or for other purposes, and which can be used both for dipping or ladling liquids and serving solids.

Other objects will appear hereinafter.

The invention consists in the combinations and arrangements of parts hereinafter described and claimed.

The invention will be best understood by reference to the accompanying drawings, forming a part of this specification, and in which, Fig. 1 represents a top plan view showing my improved serving implement;

Fig. 2 represents an edge view thereof;

Fig. 3 represents another edge view of the implement with parts in section, this view showing the implement as it appears when conveying a solid article of food, and there being incorporated in this view in broken lines the figure of a hand to illustrate how the implement is grasped by the hand for its manipulation; and Fig. 4 represents a cross section through the two handles of the implement and looking in the direction of the line 4—4 of Fig. 3.

The preferred form of construction, as illustrated in the accompanying drawings, comprises two handles 5 and 6, the handle 5 being provided at one end with a suitable ladle bowl 7, while the handle 6 is provided at the corresponding end with a suitable spoon bowl 8 which has the forward portion of its rim or edge 9 serrated or toothed as at 10 for engaging solid foods to be taken up and conveyed.

According to an important feature of my invention, the two handles 5 and 6 are so connected and held together that they may be moved toward and away from each other and also be capable of having a limited swiveling movement. The means to this end comprises a post 11 which has one end fixed at 12 in the handle 5 and which has its other end taken through an aperture 12' in the handle 6, the free end of said post having a thumb nut 13 threaded thereon. For maintaining the handles in separated relation with the handle 6 engaging the thumb nut 13, which serves as a stop for the purpose, a coiled spring 14 is mounted around the post 11 between the handles, one end of the spring at 15 being engaged in the handle 5 while the opposite end 16 of the spring extends for a distance underneath the handle 6 and is engaged therewith at 17 in such manner that the spring will place the handle 6 under lateral tension so as to hold it normally in angular relation to the handle 5 as shown in Fig. 1, the purpose of the lateral tension exerted on the handle 6 being to swing the handle 6 at such an angle that the spoon bowl 8 will be swung in such relation to the ladle bowl 7 that said ladle bowl may be used in dipping or ladling liquids and may also be open to receive therein any solid foods to be conveyed.

The handle 5, at its free end, carries a stud 18 which is taken through an elongated slot 19 of a link member 20, there being a collar 21 secured upon one end of the stud and a nut 22 upon the opposite end thereof whereby the link member is mounted to the handle 5 for both sliding and swiveling movements. Projecting from the other handle 6, which it will be noted extends slightly beyond the end of the handle 5, is a pin 23 which is taken through the slot 19 of the link 20 and is headed at 24. By this link and pin arrangement, the handles are operatively connected at their free ends so that they may be moved toward and away from each other and also so that the handle 6 may freely move laterally under the influence of the coiled spring 14, the head 24 on the pin 23 serving, however, as a stop for limiting the distance the free end of the handle 6 may be spaced from the free end of the handle 5.

In use my improved serving implement is grasped by the hand, as illustrated in broken lines in Fig. 3, the thumb being placed upon the handle 6 while the first and second fingers are engaged on opposite sides of a finger engaging element 25 which projects from the handle 5 at a point in advance of the position whereat the post 11 is secured to said handle 5. By grasping the handles in this manner, the ladle bowl may readily be used to dip or ladle liquid foods or to take up and convey solid foods. When liquid foods are dipped or ladled, the spoon bowl 8 may be permitted to occupy the position shown in Fig. 1 where it will not interfere in any way with the dipping or ladling operations; but when solid foods are to be conveyed, the handle 6 may be readily pressed toward the handle 5 and at the same time swung into parallel relation therewith so as to engage the spoon bowl 8 with the article taken up on the ladle bowl 7 as illustrated in Fig. 3. Preferably and as shown, the neck portions 26 and 27 of the respective handles 5 and 6 are bent in the same direction and in such manner that the spoon bowl 8 may be brought into close engagement with the ladle bowl 7 when it is desired to convey small articles of food. As illustrated in Fig. 4, the finger engaging element 25 is divided into forks 25' adapted to be rested upon a table or other surface for the suitable support of the implement thereon in upright position.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A serving implement comprising a pair of handles with cooperating food holding means on corresponding ends thereof; connections adjustably connecting said handles at a point intermediate their lengths and at the free ends thereof; and means associated with one of said connections for normally adjusting one of the handles laterally at an angle to the other, substantially as described.

2. A serving implement comprising a pair of handles whose corresponding ends are fashioned to take up and convey food; and connecting means connecting said handles and arranged to permit them to be moved toward and away from each other and to be swung laterally at an angle to each other, substantially as described.

3. A serving implement comprising a pair of handles whose corresponding ends are fashioned to take up and convey food; connecting means connecting said handles and arranged to permit them to be moved toward and away from each other and to be swung laterally at an angle to each other; and a finger engaging part projecting from one of said handles, substantially as described.

4. A serving implement comprising a pair of handles whose corresponding ends are fashioned to take up and convey food; a post fixed to one handle, taken through the other handle and having a nut threaded on its free end; a spring on said post resiliently holding the handles apart; and a swiveling connection between the free ends of said handles, substantially as described.

5. A serving implement comprising a pair of handles whose corresponding ends are fashioned to take up and convey food; a post fixed to one handle intermediate its length, taken through the other handle and having a nut threaded on its free end; a spring on said post resiliently holding the handles apart and placing lateral tension on one handle; and a pin and a link having sliding connection arranged respectively on the free ends of said handles, substantially as described.

6. A serving implement comprising a pair of handles connected intermediate their length and at one end for movement toward and away from each other and also for swiveling movement; a bowl on the free end of one handle; and a bowl with teeth on the free end of the other handle to cooperate with the first mentioned bowl in taking up and conveying food, substantially as described.

7. A serving implement comprising a ladle with a handle having a finger engaging projection; a spoon with a handle; a post projecting from the ladle handle and taken through the spoon handle; a thumb nut threaded on the free end of the post; a spring on the post imprisoned between said handles and placing the spoon handle under lateral tension; a link pivoted on the free end of the ladle handle and slotted; and a pin projecting from the spoon handle and slidable in the slot of said link, substantially as described.

In testimony whereof I have signed my name to this specification.

SAMUEL W. JAMES.